United States Patent [19]

Nagasawa et al.

[11] Patent Number: 4,884,108
[45] Date of Patent: Nov. 28, 1989

[54] MECHANISM FOR RECIPROCATING AN ORIGINAL TABLE OF A COPYING APPARATUS

[75] Inventors: Tamami Nagasawa, Osaka; Takahiro Fukunaga, Nara, both of Japan

[73] Assignee: Sharp Kabushiki Kaisha, Japan

[21] Appl. No.: 270,902

[22] Filed: Nov. 14, 1988

[30] Foreign Application Priority Data

Nov. 13, 1987 [JP] Japan ................................ 62-287738

[51] Int. Cl.4 ............................................ G03G 15/00
[52] U.S. Cl. ................................... 355/234; 355/233; 192/48.1; 192/48.2
[58] Field of Search ............... 355/234, 235, 236, 233; 378/208, 209; 220/230; 335/9, 10, 11, 21, 23; 192/48.1, 48.2, 48.7

[56] References Cited

U.S. PATENT DOCUMENTS

| | | | |
|---|---|---|---|
| 4,026,397 | 5/1977 | Raus | 192/48.1 |
| 4,521,099 | 6/1985 | Katayama et al. | 355/234 |
| 4,570,768 | 2/1986 | Nishimura et al. | 192/48.2 X |
| 4,621,719 | 11/1986 | Kittredge | 192/48.1 |
| 4,665,821 | 5/1987 | Harry et al. | 192/48.1 X |
| 4,707,113 | 11/1987 | Shinbrot et al. | 355/234 X |

Primary Examiner—A. C. Prescott
Attorney, Agent, or Firm—Irell & Manella

[57] ABSTRACT

A mechanism for reciprocating an original table of a copying apparatus, comprising a driving means for reciprocating the original table, and two clutch means for transmitting a driving force to said moving means, one of which is used when moving said original table forward and the other of which is used when moving said original table backward. The mechanism further comprises: one solenoid which is movably mounted; a change-over means for changing the position of the solenoid from a first position to a second position and vice versa in response to the movement of the original table; and a transfer means for actuating selected one of the clutch means in response to the operation of the solenoid, the selected one corresponding to the position of the solenoid.

7 Claims, 2 Drawing Sheets

MECHANISM FOR RECIPROCATING AN ORIGINAL TABLE OF A COPYING APPARATUS

BACKGROUND OF THE INVENTION

1. Field of the Invention

This invention relates to a mechanism for reciprocating an original table of a copying apparatus such as an electrostatic type copying apparatus, a laser printer or the like.

2. Description of the Prior Art

Some types of copying apparatuses have an original table or document table on which an original or document to be copied is placed and which reciprocates driving the copying process. A mechanism for reciprocating the original table is equipped with two clutch means, one is used for moving the original table forward, and the other one for moving the original table backward, in order to control the reciprocating operation of the original table, and also with two solenoids as an actuator for switching-over the operation of the two spring clutches. Such a conventional mechanism for reciprocating an original table has the disadvantages that the construction is complicated and that the manufacturing cost cannot be lowered because the disposition of the two solenoids causes an increased number of parts.

Recently, an improved mechanism for reciprocating an original table has been proposed. In such a mechanism, two spring clutches are alternatively operated by one solenoid. More specifically, this mechanism has one solenoid which is fixedly mounted, and forward and backward forces of the plunger of the solenoid are transmitted to both of the two spring clutches by way of a complicated link mechanism. This complicated structure provides an increased number of parts which is greater than that of the above-mentioned conventional mechanism.

SUMMARY OF THE INVENTION

The mechanism for reciprocating an original table of a copying apparatus, which overcomes the above-discussed and numerous other disadvantages and deficiencies of the prior art, the driving means for reciprocating the original table, and two clutch means for transmitting a driving force to said moving means, one of which is used when moving said original table forward and the other of which is used when moving said original table backward, the improvement exists in that said mechanism further comprises: one solenoid which is movably mounted; a change-over means for changing the position of said solenoid from a first position to a second position and vice versa in response to the movement of said original table; and a transfer means for actuating selected one of said clutch means in response to the operation of said solenoid, said selected one corresponding to the position of said solenoid.

In a preferred embodiment, the end portion of the plunger of said solenoid is slidably engaged with said portion of said transfer means.

In a preferred embodiment, the transfer means comprises an elongated portion which has a path extending along the elongated direction, and said first and second positions are the both ends of said path, respectively.

In a preferred embodiment, the path is an ark-like aperture, and said end portion of said plunger engages with said aperture.

In a preferred embodiment, the back end of said solenoid is pivotally mounted, and said solenoid is rotated about said back end by said other moving means to reciprocate between said first and second positions.

In a preferred embodiment, the path is an ark-like groove, and said end portion of said plunger engages with said groove.

In a preferred embodiment, the back end of said solenoid is pivotally mounted, and said solenoid is rotated about said back end by said other moving means to reciprocate between said first and second positions.

Accordingly, the invention described herein makes possible the objectives of (1) providing a mechanism for reciprocating an original table which requires only one solenoid; (2) providing a mechanism for reciprocating an original table which is simple in structure; (3) providing a mechanism for reciprocating an original table which requires a reduced number of parts; and (4) providing a mechanism for reciprocating an original table which can be manufactured at a low cost.

In the above-mentioned construction, when the solenoid is located at the first predetermined position, the solenoid changes over the transmission and the interruption of one of the two clutch means via the transfer means to control the backward movement of the original table. After the transmission of the driving force is carried out and thereby the original table reaches a predetermined position, the change-over means for moving the solenoid is operated to move the solenoid to the second position. When the solenoid positioned at the second position is actuated, the other one of the two clutch means is operated via the transfer means to move the original table in the forward direction. When the original table arrives at a predetermined position by this movement, the changeover means again moves the solenoid to the first position, and the actuation of the solenoid at the first position causes the original table to move in the backward direction so that the original table returns to its home position. By the repetition of these operation processes, the original table is reciprocally moved.

In the mechanism of the invention, accordingly, the two clutch means for moving forward and backward the original table can be operated by one solenoid so that the number of parts is decreased, resulting in the simplified construction and reduced manufacturing cost. It should be noted that the abovementioned advantages can be achieved without causing any of the above-mentioned problems in the prior art such as that the construction in which two clutches are operated by one solenoid causes an increased number of parts.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 4:
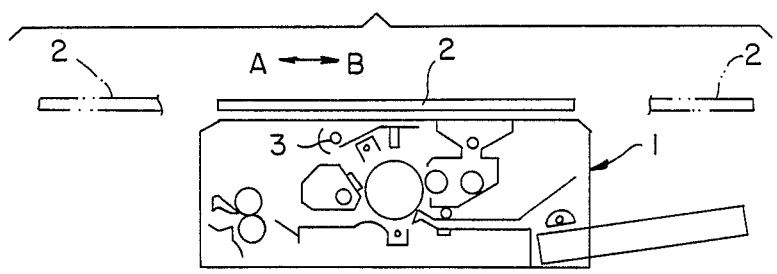
FIG. 4 is a diagram showing a copying apparatus.

An example will be described by referring the accompanying drawings. Referring to FIG. 4, an original table 2 is disposed on the main body 1 of an electrostatic type copying apparatus so that the original table 2 can reciprocally move toward directions A and B. The reciprocal movement of the original table 2 causes changes in relative positions between an original disposed on the original table 2 and components incorporated in the main body 1 such as a light source 3 or the like.

Figure 3:
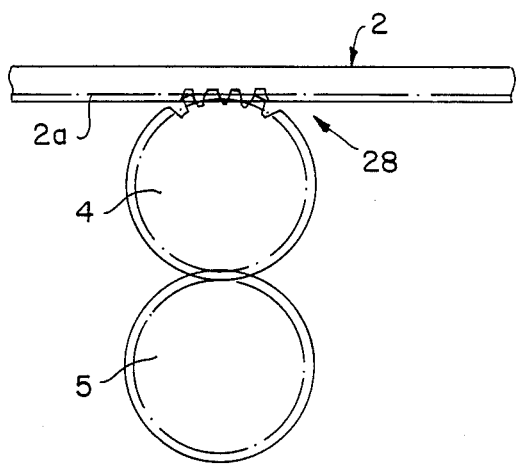
FIG. 3 is a diagram illustrating a driving means.

A rack 2a is formed at a lower portion of the original table 2, as shown in FIG. 3. The rack 2a is meshed with a pinion gear 4 disposed in the upper portion of the main body 1. The rack 2a and the pinion gear 4 constitute a driving mechanism 28 for moving the original table 2. The pinion gear 4 is meshed with an output gear 5.

Figure 1:
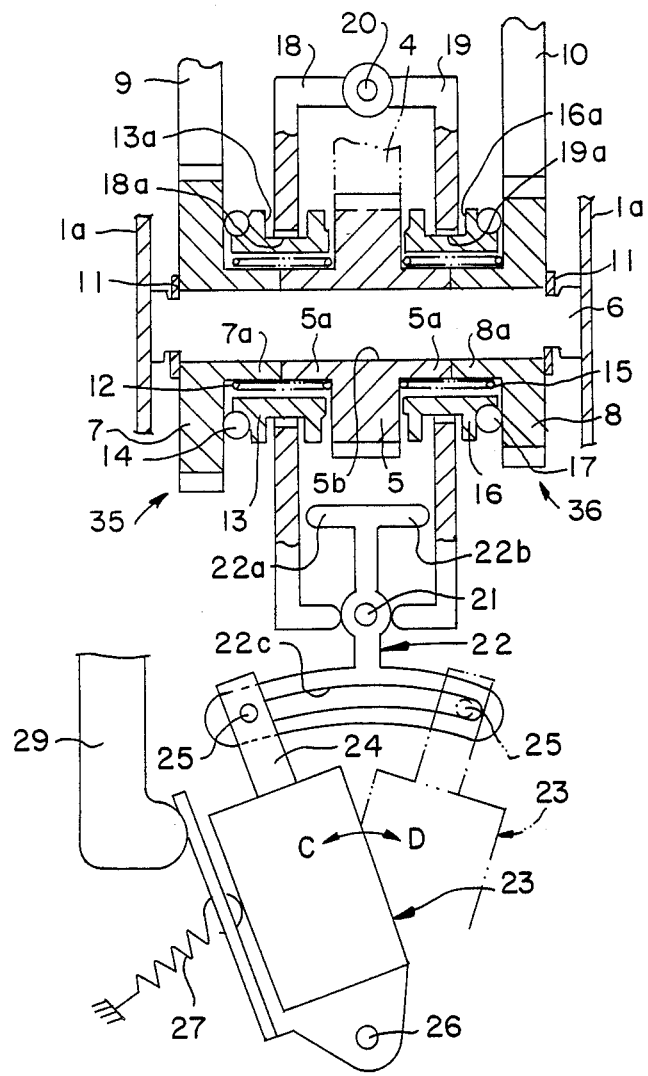
FIG. 1 is a diagram illustrating a mechanism for reciprocating an original table according to the invention.

As shown in FIG. 1, the output gear 5 has widened portions 5a at the center portion thereof, and is rotatably supported by a clutch shaft 6 which is inserted into a hole 5b penetrating the widened portions 5a. The clutch shaft 6 is securely mounted at both end portions to frames 1a of the main body 1. A backward gear 7 and a forward gear 8 are rotatably fitted to the clutch shaft 6. The movement of the gears 7 and 8 in the axial direction is restricted by means of retaining rings 11 which are mounted on the clutch shaft 6. Further, the backward gear 7 and the forward gear 8 respectively are meshed with a backward power transmission gear 9 and forward power transmission gear 10 through which the driving force from a main motor (not shown) is transmitted to the backward and forward gears 7 and 8.

A widened portion 7a is formed at the center portion of the backward gear 7. A spring 12 is fitted on the outer circumference of the widened portions 7a and 5a in such a manner that the spring 12 bridges therebetween. A sleeve 13 is fitted to the outer circumference of the spring 12. An O-ring 14 is secured to a side surface of the sleeve 13 such that the O-ring is contactable with a side surface of the backward gear 7. Accordingly, a spring clutch 35 for backward motion consists of the output gear 5, the clutch shaft 6, the backward gear 7, the spring 12, the sleeve 13 and the O-ring 14.

Similarly, a widened portion 8a is formed at the center portion of the forward gear 8. A spring 15 is fitted on the outer circumference of the widened portions 8a and 5a in such a manner that the spring 15 bridges therebetween. A sleeve 16 is fitted to the outer circumference of the spring 15. An O-ring 17 is secured to a side surface of the sleeve 16 such that the O-ring is contactable with a side surface of the forward gear 8. Accordingly, a spring clutch 36 for forward motion consists of the output gear 5, the clutch shaft 6, the forward gear 8, the spring 15, the sleeve 16 and the O-ring 17.

The sleeve 13 and the sleeve 16 are respectively formed with an outer circular groove 13a and an outer circular groove 16a. A ring portion 18a of a first arm 18 is movably fitted into the groove 13a, and a ring portion 19a of the second arm 19 is movably fitted into the groove 16a. Each one end portion of the first arm 18 and the second arm 19 is pivotally supported by a shaft 20. A shaft 21 extending in alignment with the longitudinal direction of the shaft 20 is disposed in the vicinity of the other end portions of the first and second arms 18 and 19. A third arm 22 is pivotally supported by the shaft 22. Projecting portions 22a and 22b are formed at one end side of the third arm 22 so that the projecting portion 22a can push the first arm 18 and that the projecting portion 22b can push the second arm 19. Moreover, an ark-shaped opening 22c is formed at an end portion of the third arm 22. A solenoid 23 is pivotally supported at its back end portion by a pin 26 so as to be rotatable in the directions C and D. A pin 25 is fixed at the end of the plunger 24 of the solenoid 23. The pin 25 is slidably engaged with the opening 22c. By the engagement of the pin 25 with either of the end portions of the opening 22c, the solenoid 23 can be selectively positioned at either of the two positions of the forward motion and the backward motion. The opening 22c may be replaced with a groove.

Figure 2:
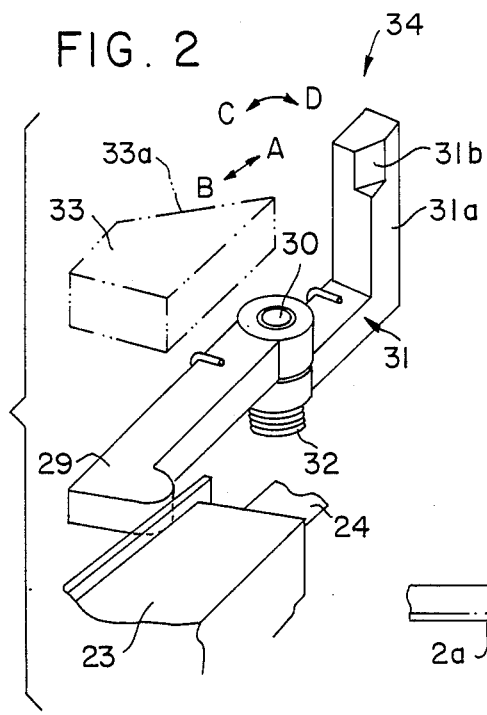
FIG. 2 is a perspective view showing a moving means used in the mechanism of FIG. 1.

One end portion of a coil spring 27 is secured to the solenoid 23. The solenoid 23 is pulled in a direction C by the spring 27. Further, a first change-over arm 29 is disposed in the vicinity of the solenoid 23, as shown in FIGS. 1 and 2. The first change-over arm 29 is supported by a shaft 30 so that it is rotatable approximately along the directions C and D. Moreover, a second change-over arm 31 is rotatably mounted and supported to the shaft 30, and a coil spring 32 is mounted to the shaft 30. The first change-over arm 30 is elastically and in a straight line connected to the second arm 31 by the coil spring 32. The second change-over arm 31 is provided with an upward portion 31a rising in the axial direction of the shaft 30. Formed on the upward portion 31a is a notch 31b which associates with a tapered surface 33a of a change-over block 33.

The change-over block 33 is provided on a lower surface of the original table 2 such that the change-over block 33 and the original table 2 are movable along the directions A and B. The block 33 is formed with the tapered surface 33a so that the second arm 31 is rotated by the engagement of the tapered surface 33a and the notch 31b when the change-over block 33 moves toward the direction A. A change-over means 34 is comprised by the coil spring 27, the first change-over arm 29, the second arm 31, the coil spring 32 and the block 33 provided with the tapered surface 33a. The change-over means moves the solenoid 23 between the above-mentioned two positions in response to the reciprocal movement of the original table 2.

The operation of the mechanism having such a construction will be described. When a copy start key (not shown) is pressed, a copying operation starts. At this time, the main motor has been already started to transmit the driving force to the backward gear 7 through the backward power transmission gear 9. When the solenoid 23 in the position for the backward motion as shown by the solid line in FIG. 1 is made ON and energized and thereby the plunger 24 is retracted into the solenoid 23, the third arm 22 is rotated in the direction C. When the third arm 22 is rotated toward the direction C, the first arm 18 is pushed by the projecting portion 22a of the third arm 22 and thereby is rotated in the direction which is approximately the same as the direction C. When the first arm 18 rotates about the shaft 20, the sleeve 13 is moved toward the backward gear 7 as the movement of the first arm 18. By the movement of the sleeve 13, the O-ring 14 is compressively contacted with a side surface of the backward gear 7 to make a clutch engagement between the the backward gear 7 and the output gear 5. Thence, the driving force of the backward gear 7 is transmitted to the output gear 5 through the spring 12 so that the driving force of the pinion gear 4 is transmitted to the rack 2a to move the original table 2 in the backward direction (direction A).

When the original table 2 arrives at a copy starting position, an original table sensing switch (not shown) is activated to make the solenoid 23, and the plunger 24 of the solenoid 23 projects from the solenoid 23. By the advancement of the plunger 24 the clutch engagement between the the backward 7 and the output gear 5 is broken, resulting in that the rotating force of the backward gear 7 is interrupted and the original table 2 halts the travel thereof. As a result of the series of operations, the tapered surface 33a of the change-over block 33 is engaged with the notch 31b of the second arm 31 to rotate the second arm 31 in the direction C with the movement of the original table 2 in the backward direction. The turning force is stored in the coil spring 32. When the plunger 24 of the solenoid 23 advances, the first change-over arm 29 is rotated in the direction which is approximately same as the direction D, by the turning force stored in the coil spring 32. The rotation of the first change-over arm 29 causes the solenoid 23 to rotate in the direction D against the force of the coil spring 27 and arrive to the position shown by the two-dot chain line in FIG. 1. When the solenoid 23 is made ON again and the plunger 24 is retracted, the third arm 22 rotates along the direction D. The second arm 19 is pushed by the second arm 22 so as to rotate about the shaft 20. By the rotation of the second arm 19, the driving force of the forward gear 8 is transmitted to the output gear 5 which has been already rotated in the same manner as described above. The driving force is transmitted to the pinion gear 4 to move the original table 2 in the forward direction (direction B).

When the original table 2 moves along the forward direction and arrives at the turning point, an original table sensing switch (not shown) is activated to make the solenoid 23 OFF again and thereby the plunger 4 is advanced. By the advancement of the plunger 24, the driving force of the input gear 8 is interrupted to stop the movement of the original table 2. The movement of the original table 2 in the forward direction and the series or the operation releases the engagement between the tapered surface 33a of the change-over block 33 and the notch 31b of the second change-over arm 31. By the advancement of the plunger 24, the solenoid 23 is rotated in the direction C by the force of the coil spring 27 toward the position for the backward motion. When the solenoid 23 is made ON and the plunger 24 is retracted, the third arm 22 rotates about the shaft 21 in the direction C, the driving force of the backward gear 7 is transmitted to the output gear 5 by way of the spring 12 in the same manner as described above, and the driving force of the output gear 5 is transmitted to the pinion gear 4. The driving force of the pinion gear 4 is transmitted to the rack 2a of the original table 2, and, therefore, the solenoid 23 is made OFF when the original table 2 arrives at the home position so that the movement of the original table 2 is stopped.

The above-described operation is done one time in case of the single copying, and is required to be repeated in the multiple copying. In the latter case, the solenoid 23 is not made OFF when the original table 2 arrives at the home position.

According to the mechanism for reciprocating an original table according to the present invention, it is unnecessary to install two solenoids or a complicated link mechanism, and, therefore, the number of parts can be decreased, resulting in a simplified structure and the reduced manufacturing cost.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. In a mechanism for reciprocating an original table of a copying apparatus, comprising a driving means for reciprocating the original table, and two clutch means for transmitting a driving force to a moving means, one of which is used when moving said original table forward and the other of which is used when moving said original table backward, the improvement exists in that said mechanism further comprises: one solenoid which is movably mounted; a change-over means for changing the position of said solenoid from a first position to a second position and vice versa in response to the movement of said original table; and a transfer means for actuating selected one of said clutch means in response to the operation of said solenoid, said selected one corresponding to the position of said solenoid.

2. A mechanism according to claim 1, wherein the end portion of the plunger of said solenoid is slidably engaged with said portion of said transfer means.

3. A mechanism according to claim 1, wherein said transfer means comprises an elongated portion which has a path extending along the elongated direction, and said first and second positions are the both ends of said path, respectively.

4. A mechanism according to claim 3, wherein said path is an ark-like aperture, and said end portion of said plunger engages with said aperture.

5. A mechanism according to claim 3, wherein the back end of said solenoid is pivotally mounted, and said solenoid is rotated about said back end by said other moving means to reciprocate between said first and second positions.

6. A mechanism according to claim 3, wherein said path is an ark-like groove, and said end portion of said plunger engages with said groove.

7. A mechanism according to claim 6, wherein the back end of said solenoid is pivotally mounted, and said solenoid is rotated about said back end by said other moving means to reciprocate between said first and second positions.

* * * * *